United States Patent [19]
Nagaoka

[11] Patent Number: 5,476,037
[45] Date of Patent: Dec. 19, 1995

[54] BULBAR SKIN REMOVING APPARATUS

[76] Inventor: Tatsuo Nagaoka, 13-12, Minowa-cho 2-chome, Kohoku-ku, Tokohama-shi, Kanagawa, 223, Japan

[21] Appl. No.: 432,701

[22] Filed: May 2, 1995

[30] Foreign Application Priority Data

May 9, 1994 [JP] Japan ................... 6-117389

[51] Int. Cl.⁶ .................. A23N 7/00; A23N 15/08
[52] U.S. Cl. .................. 99/584; 99/516; 99/540
[58] Field of Search ............ 99/485, 516, 534–536, 99/537–540, 567, 584–589, 591, 593–595, 574–576; 426/481–483

[56] References Cited

U.S. PATENT DOCUMENTS

| | | | |
|---|---|---|---|
| 3,696,848 | 10/1972 | Mellon et al. | 99/516 |
| 4,361,084 | 11/1982 | Raatz | 99/584 |
| 4,450,760 | 5/1984 | Wilson | 99/536 |
| 4,457,224 | 7/1984 | Kino | 426/482 |
| 4,470,345 | 9/1984 | Miyata | 99/540 |
| 4,476,778 | 10/1984 | Clyma | 99/516 |
| 4,481,875 | 11/1984 | Toyosato | 99/593 |
| 4,530,278 | 7/1985 | Sarig et al. | 99/567 |
| 4,541,331 | 9/1985 | Narisawa et al. | 99/537 |
| 4,658,713 | 4/1987 | Nagaoka | 99/636 |
| 4,718,334 | 1/1988 | Nagaoka | 99/546 |
| 4,998,465 | 3/1991 | Fischer et al. | 99/584 |

FOREIGN PATENT DOCUMENTS

| | | |
|---|---|---|
| 60-188050 | 9/1985 | Japan . |
| 63-294772 | 12/1988 | Japan . |

*Primary Examiner*—Timothy F. Simone
*Attorney, Agent, or Firm*—Lowe, Price, LeBlanc & Becker

[57] ABSTRACT

An apparatus for removing the skins of bulbs, such as onions, garlic and scallions, with numerous slits previously provided thereon after cutting off their stems and roots, utilizing the force of jetted fluid. In this apparatus, a carrier for transferring onions placed on a pair of rollers along a direction parallel to the axes of these rollers, the carrier comprising an endless belt, such as a chain, positioned above a clearance between the parallel rollers and having a portion moving in the direction parallel to the axes of the rollers, arms having base ends fixed to the belt and axes directed toward the clearance between the rollers, and feed plates respectively attached to distal ends of the arms. In this apparatus, the bulbs placed on the rollers are subjected to compressed air jetted from obliquely above.

5 Claims, 8 Drawing Sheets

BULBAR SKIN REMOVING APPARATUS

BACKGROUND OF THE INVENTION

1. Field of the Invention

The present invention relates to an apparatus for removing the skins of bulbs, such as onion, garlic and scallion.

2. Description of the Related Art

As an example of the conventional bulbar skin removing apparatuses, one disclosed in the Japanese Patent Application Laid-Open No. 63-294772 is schematically shown in FIG. 8.

A pair of rollers R1 and R2 is rotatably mounted on a base B in a manner such that these rollers R1 and R2 are disposed in parallel with each other leaving a certain clearance therebetween. These rollers R1 and R2 are driven by an appropriate drive means to rotate in the same direction. A plurality of jet nozzles Ju and Jd are provided respectively at upper and lower sides of these rollers R1 and R2 at regular intervals along the axial directions of these rollers R1 and R2, facing these rollers R1 and R2. An upper air pipe Pu and a lower air pipe Pd supply these plural jet nozzles Ju and Jd with air to be jetted against onions riding on the paired rollers R1 and R2.

Onions with their skins having a number of slits previously made by cutters are supplied onto the paired rollers R1 and R2. The onions, riding on both the rollers R1 and R2, are rotated in the direction reverse to the rotating direction of the rollers R1 and R2, exposed to the air jetted from the plural upper and lower jet nozzles Ju and Jd, and transferred by a carrier S along the axial direction of the rollers R1 and R2 (that is, in the direction perpendicular to the surface of FIG. 8). The skin of each onion is removed by receiving the air jetted from the jet nozzles Ju and Jd. The surface area of an onion exposed to the blow of jetted air varies continuously as the onion is kept rotated constantly.

The carrier S has a base end Sb fixed to an endless belt (a chain) travelling along an elliptic track provided on a horizontal plane. The main body of the carrier S extends horizontally from its base end Sb, leaving its distal end free.

However, the above-described skin removing apparatus sometimes causes the removed bulbar skins to be blown off above the pair of rollers R1 and R2 due to the compressed air jetted upward from the lower jet nozzles Ju. Furthermore, the endless belt such as a chain, travelling along the elliptic track on the horizontal plane, supports the base end Sb of the horizontally extending carrier S in a cantilever manner. Therefore, angular moment of the carrier S acts on the base end Sb of the carrier S and the chain supporting the base end Sb, causing the chain to be twisted. For these reasons, with the above conventional skin removing apparatus, it is difficult to smoothly cause the bulbs such as onions to be transferred direction while rotating them on a pair of rollers.

OBJECTS AND SUMMARY OF THE INVENTION

An object of the present invention is to provide an apparatus for removing the skins of bulbs, which comprises a carrier means capable of stably transporting bulbs riding on a pair of rollers in a direction parallel to the axes of the rollers and also capable of preventing removed skins of bulbs from entering between the bulb and the rollers after being removed by the jet of fluid, thereby preventing the skins of bulbs from interfering with transportation and skin removing operation of bulbs.

In order to accomplish the above objects, an apparatus for removing the skins of bulbs according to the present invention has a carrier means for transferring bulbs riding on a pair of rollers, disposed parallelly on a horizontal plane, in a direction parallel to the axes of these rollers which comprises a chain positioned above the clearance between the rollers and having a portion moving in the direction parallel to the axes of the rollers, arms with the base ends fixed to the chain and the axes extending toward the clearance between the rollers, and feed plates attached respectively to distal ends of the arms. With this arrangement, the arms always remain vertical to the plane including the chain. Thus, weights of the arms and the feed plates will not cause the chain to be tested. Furthermore, compressed air is jetted against the onions rolling on a pair of rollers from obliquely above; therefore, the skins of the bulbs removed by compressed air are forcibly dropped downward through the clearance between the rollers without causing the removed skins to be blown.

DETAILED DESCRIPTION OF THE PREFERRED EMBODIMENT

An apparatus for removing the skins of bulbs, as one aspect of the present invention, will be explained with reference to FIGS. 1 to 7. In the following description, an onion will be referred to as a typical example of a bulb to be processed by the skin removing apparatus of the present invention.

Figure 2:
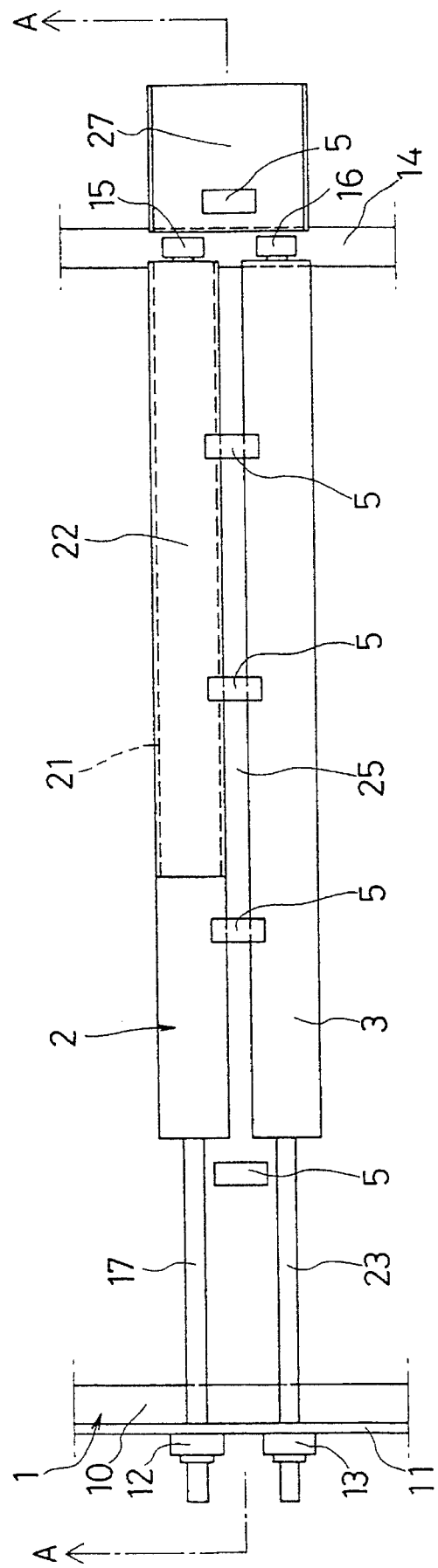
FIG. 2 is a plan shoeing an essential part of the skin removing apparatus of FIG. 1.

As illustrated in the plan of FIG. 2, a pair of rollers 2 and 3, horizontal and parallel with each other, are mounted on the base 1 leaving a predetermined clearance therebetween. More specifically, the rollers 2 and 3 have shafts 17 and 23 with one ends supported by bearings 12 and 13 fixed on the side surface of a support plate 11 secured to the base 1 and the other ends supported by bearings 15 and 16 fixed on a transverse member 14 secured to the base 1.

Onions are supplied one by one from the left end of the paired rollers 2 and 3 of FIG. 2, so that the onions riding on the rollers 2 and 3 are given rolling motion in response to the rotational movement of the rollers 2 and 3. Being pushed by feed plates 5, onions placed on the rollers 2 and 3 move along the axial direction of the rollers 2 and 3 and are then dropped into a shoot 27 provided at the longitudinally central portion of the transverse member 14. The mechanism relating to the drive operation of the feed plates 5 constituting the carrier will be explained later in detail.

One of the paired rollers, i.e. the roller 2, has a smaller-diameter portion 21 partly formed at one end thereof which corresponds to a downstream side with respect to the onion transportation direction. The surface of this smaller-diameter portion 21 is covered by a rubber tube 22. As a result, the roller 2 maintains a constant outer diameter all along a longitudinal direction thereof.

Next, the structure relating to the drive operation of the feed plates 5 constituting the carrier will be explained with reference to FIG. 1. Two shafts 33 and 38, parallel with each other and extending horizontally in the direction normal to the axes of the rollers 2 and 3, are provided above these rollers 2 and 3 and rotatably supported in a fixed positions with respect to the base 1. Sprocket wheels 34 and 39 with equal diameters are respectively fixed to the shafts 33 and 34 at its central part, and an endless roller chain 4 is wound round these two sprockets 34 and 39.

Thus, the part of the roller chain 4 not engaging with the sprocket wheels 34 and 39 constitutes an upper horizontal portion 4a and a lower horizontal portion 4b. A plane (i.e. a vertical plane), including both the upper and lower horizontal portions 4a and 4b of the roller chain 4, is perpendicular to a horizontal plane which includes both the axes of the paired rollers 2 and 3. The lower horizontal portion 4b of the roller chain 4 is positioned (together with the upper horizontal portion 4a) directly above a clearance 25 between the rollers 2 and 3 (refer to FIG. 4), and extends in the direction of the clearance 25, i.e. in a direction parallel to the axes of the rollers 2 and 3.

A plurality of arms 43, each having a feed plate 5 at the distal end thereof, have their base ends fixed to the roller chain 4 at regular intervals along the longitudinal direction of the roller chain 4. When the one sprocket wheel 34 is driven, the roller chain 4 is rotated and, as a result, the lower horizontal portion 4b of the roller chain 4 shifts from the left to the right as shown by an arrow a in FIG. 1. Accordingly, the feed plates 5 extending downward from the lower horizontal portion 4b shift from the left to the right as shown in FIG. 1. Therefore, onions carried on the rollers 2 and 3 are pushed from behind by these feed plates 5 and forcibly transported near the inlet of the chute 27.

Figure 4:
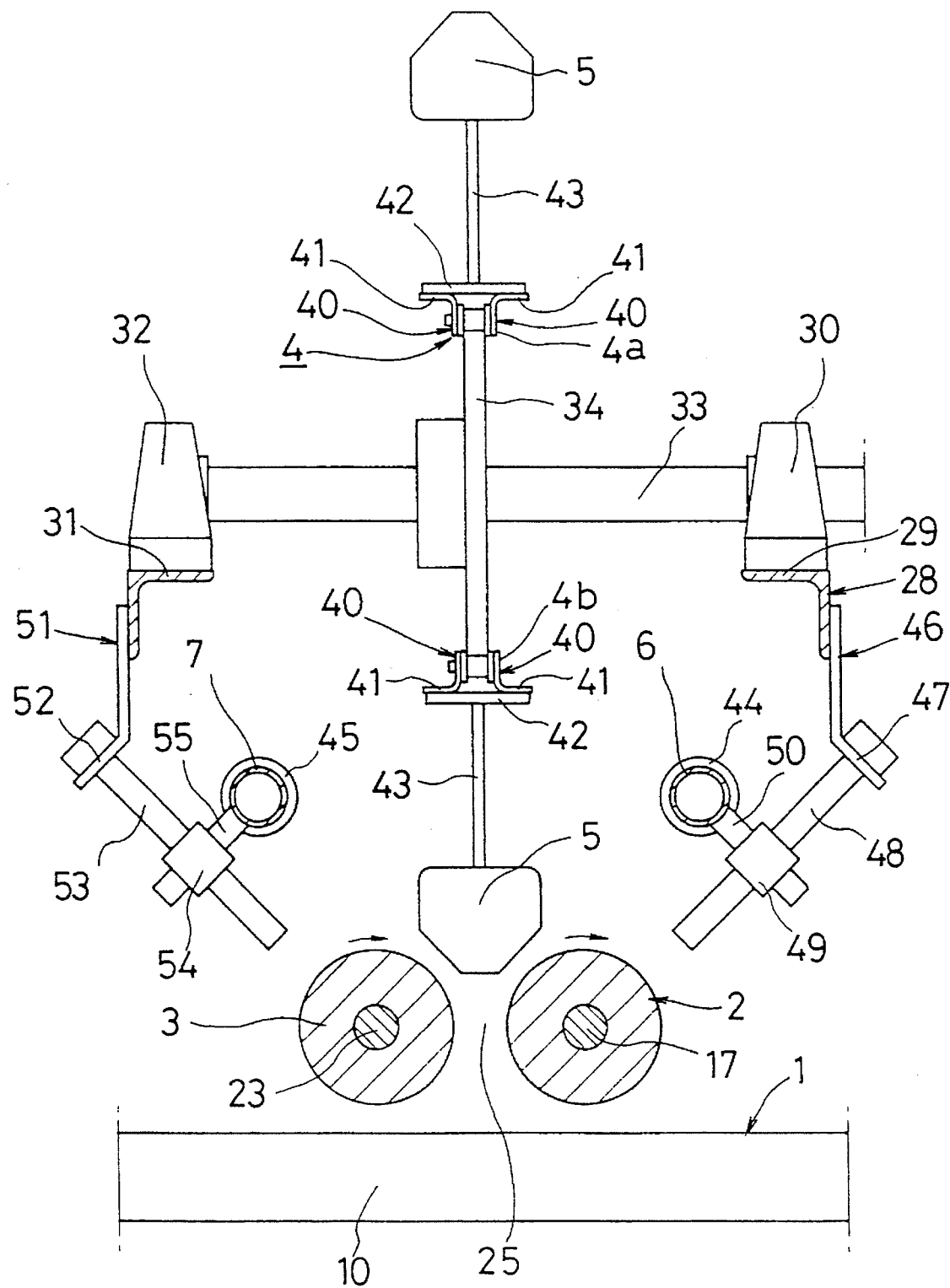
FIG. 4 is a partly cross-sectional side view showing the skin removing apparatus of FIG. 1, taken along a B—B of FIG. 1.

The shaft 33, fixing to the sprocket wheel 34 at its central part, have right and left ends rotatably supported by bearings 30 and 32 as shown in FIG. 4. These bearings 30 and 32 are fixed onto horizontal plane portions 29, 31 of L-shaped cross frames 28, 28 which are disposed in fixed relation to the base 1 and extend in parallel with the axes of the rollers 2 and 3.

Figure 5:
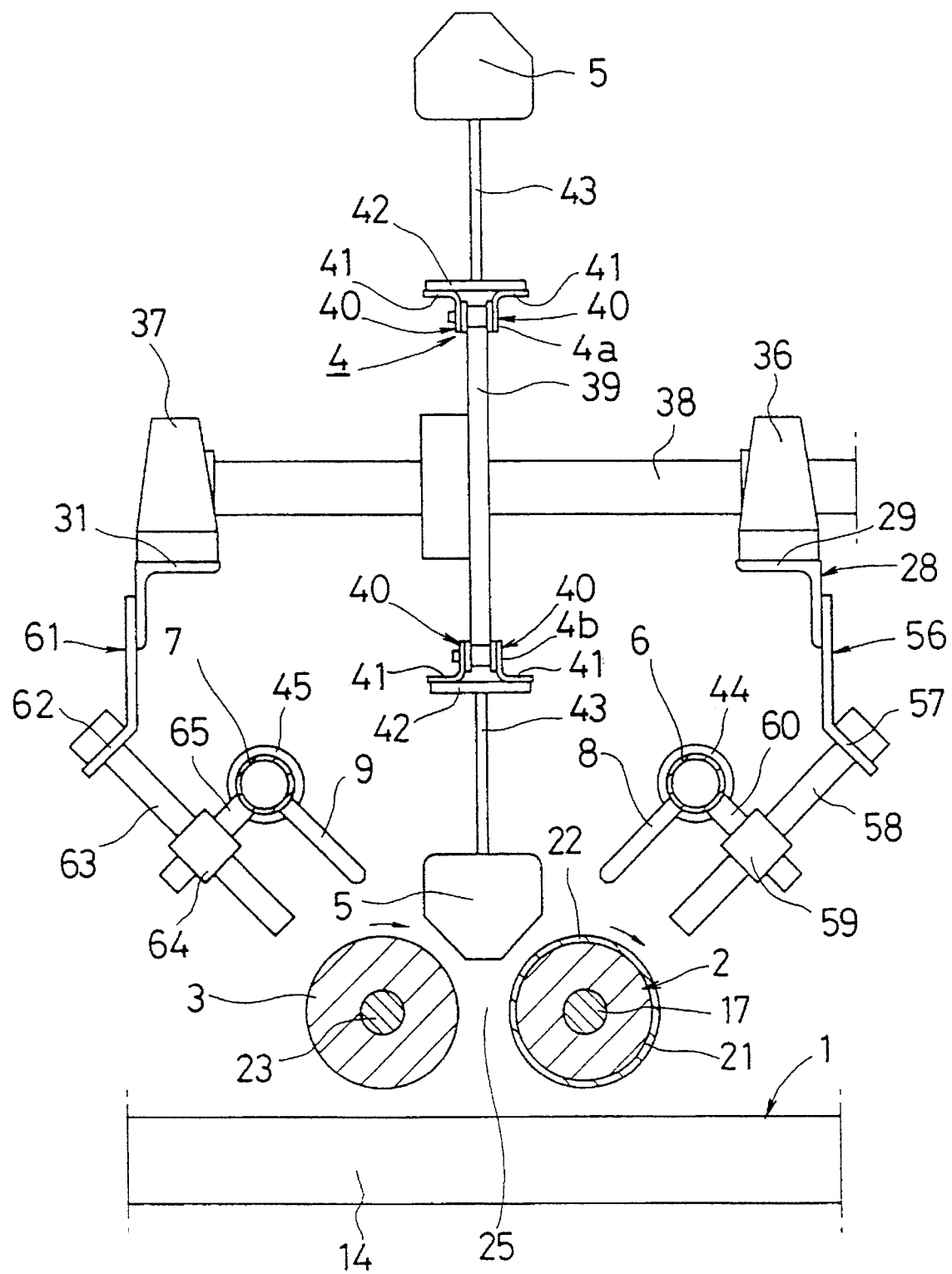
FIG. 5 is a partly cross-sectional side view showing the skin removing apparatus of FIG. 1, taken along a line C—C of FIG. 1.

On the other hand, the shaft 38, fixing the sprocket wheel 39 at its central part, have right and left ends rotatably supported by bearings 36 and 37 as shown in FIG. 5. These bearings 36 and 37 are also fixed onto horizontal plane portions 29, 31 of the frames 28, 28 with L-shaped cross section in the same manner as the bearings 30 and 32.

Next, the mechanism for mounting the arm 43 of each feed plate 5 secured on the roller chain 4 will be explained with reference to FIG. 4.

Figure 1:
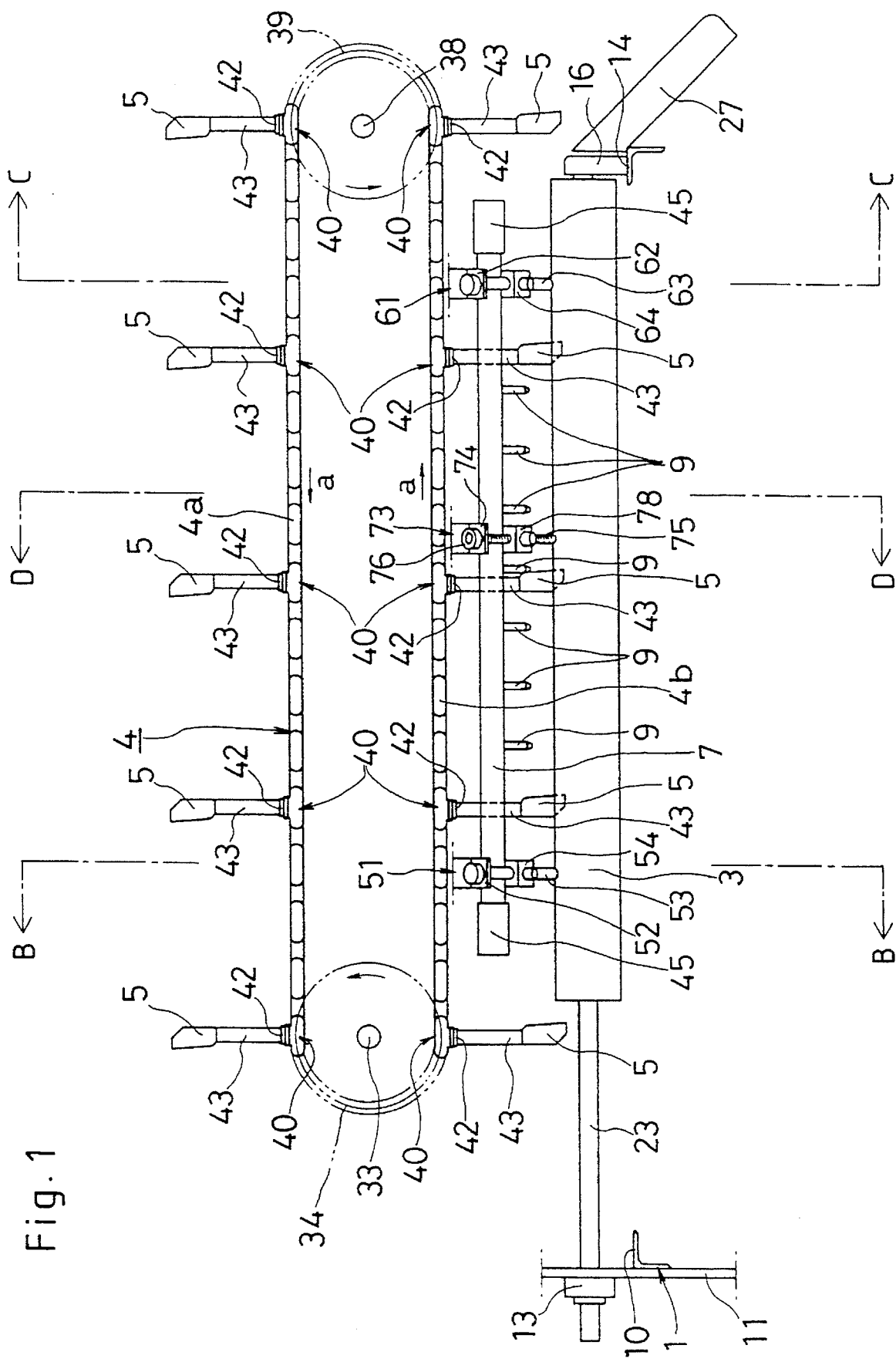
FIG. 1 is a front view showing one embodiment of an apparatus for removing the skins of bulbs in accordance with the present invention.

Some of link plates 40 constituting the roller chain 4, ten link plates in the example of FIG. 1, are formed with a pair of protruding portions 41, 41 first extending perpendicularly and then outwardly to the right and the left, respectively. A flat plate 42 is fixed to the base end of arm 43, with a feed plate 5 fixed to the distal end thereof, and the flat plate 42 is fixed to the protruding portions 41 and 41 of the link plate 40. With this arrangement, the feed plate 5 constituting the carrier is connected to the roller chain 4, and thus shifts in response to the drive motion of the roller chain 4.

Next, the mechanism relating to air jetting will be explained.

Figure 3:
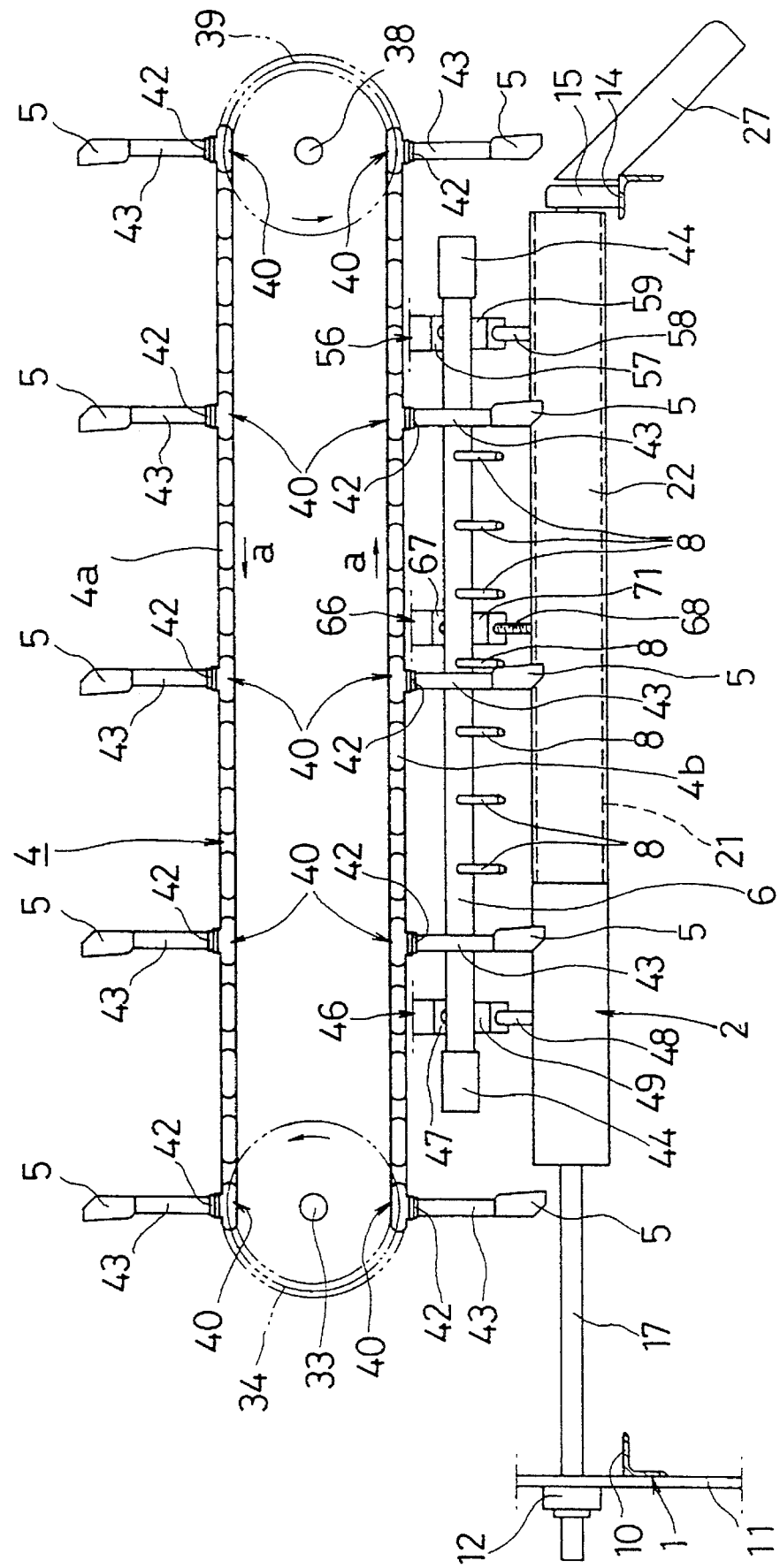
FIG. 3 is a front view showing the skin removing apparatus of FIG. 1, taken along a line A—A of FIG. 2.

As illustrated in FIGS. 1 or 3, two air pipes 6 and 7 are disposed substantially above the rollers 2 and 3 in parallel with axes of the rollers 2 and 3. More specifically, these air pipes 6 and 7 are located not right above the rollers 2 and 3 but outwardly off the rollers 2 and 3, as shown in FIGS. 4 and 5.

These air pipes 6 and 7 have both ends closed by plugs 44, 44 and 45, 45, respectively, and are communicated with an air compressor (not shown) acting as compression air supplying means. A plurality of jet nozzles 8 ---, 9 --- are fixed to these air pipes 6 and 7 at its base end. Each of these jet nozzles 8 ---, 9 --- has an axis (i.e. compressed air jetting direction) pointing to the clearance 25 between the rollers 2 and 3.

The air pipe 6 is supported by brackets 46, 66 and 56 at its upstream, midstream and downstream portions along the onion transfer direction, as shown in FIG. 3. The air pipe 7 is supported by brackets 51, 73 and 61 at its upstream, midstream and downstream portions along the onion transportation direction, as shown in FIG. 1.

FIG. 4 shows the structure for supporting the air pipes 6 and 7 at their upstream portions using the brackets 46 and 51. The brackets 46 and 51 have base ends fixed to vertical plane portions of the frames 28, 28 with L-shaped cross section, longitudinal middle portions extending vertically downward, and distal end portions bent outwardly to form inclined portions 47, 52. Fixed on these inclined portions 47 and 52 are base ends of guide rods 48 and 53. Axes of the guide rods 48, 53 are directed obliquely inward and intersect perpendicularly with axes of the rollers 2, 3, respectively.

Slide members 49 and 54 are slidably coupled with these guide rods 48 and 53. Support rods 50 and 55, having axes intersecting perpendicularly with the axes of the guide rods 48 and 53 and extending diagonally towards upper inward, are fixed to these slide members 49 and 54 through their base ends. The air pipes 6 and 7 are respectively fixed, at a point on their respective outer peripheral surfaces on the upper ends of these support rods 50 and 55.

FIG. 5 shows the structure for supporting the air pipes 6 and 7 at their downstream portions using the brackets 56 and 61. This structure is substantially the same as the structure of FIG. 4 for supporting the air pipes 6 and 7 by the brackets 46 and 51. That is, in FIG. 5, guide rods 58 and 63 are secured onto the inclined portions 57 and 62 formed towards the distal ends of the brackets 56 and 61. Slide members 59 and 64, secured to the support rods 60 and 65, are slidably coupled with these guide rods 58 and 63. The air pipes 6 and 7 are respectively fixed at a point on their respective outer peripheral surfaces to the upper ends of these support rods 60 and 65.

Figure 7:
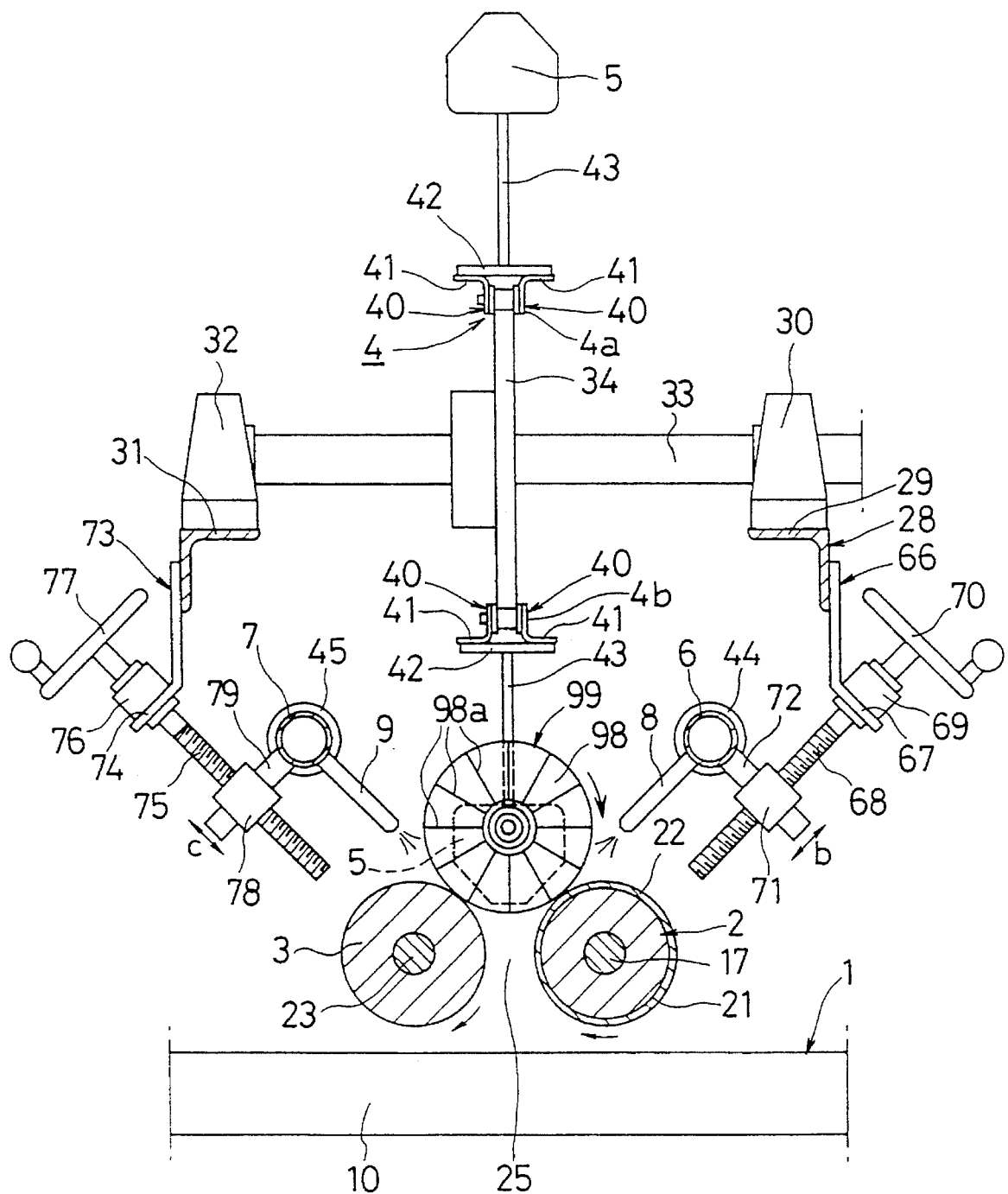
FIG. 7 is a partly cross-sectional side view showing the skin removing apparatus of FIG. 1, taken along a line D—D of FIG. 1.
Figure 8:
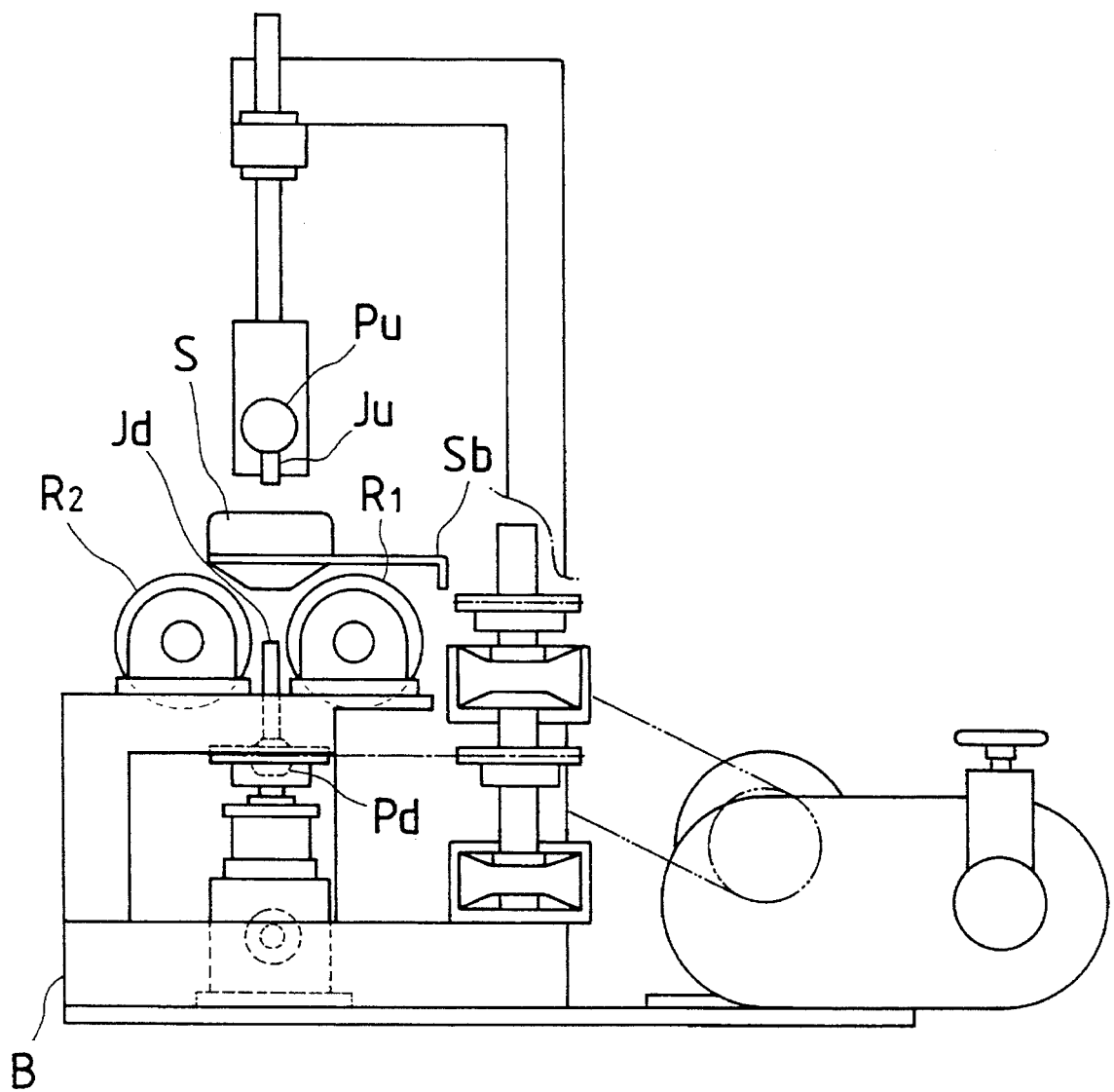
FIG. 8 is a side view showing a conventional apparatus for removing the skins of bulbs.

FIG. 7 shows the structure for supporting the air pipes 6 and 7 at their midstream portions using the brackets 66 and 73. This structure is substantially the same as the structures of FIGS. 4 and 5 for supporting the air pipes 6 and 7 by the brackets 46, 51 and 56, 61, but is different in that the guide rods 48, 53 and 58, 63 are replaced by screw rods 68 and 75 and in that the slide members 49, 54 and 59, 64 are replaced by nuts 71 and 78. Furthermore, bearings 69 and 76 are respectively secured onto the outsides of inclined portions 67 and 74 forming distal portions of the brackets 66 and 73 in order that the screw rods 68 and 75 are rotatably supported at their base end portions by these bearings 69 and 76. Handles 70 and 77 are securely attached on the base ends (the upper ends) of the screw rods 68 and 75.

The above guide rod 48, screw rod 68 and guide rod 58 are parallel with each other and positioned on the same plane. In the same manner, the above guide rod 53, screw rod 75 and guide rod 63 are parallel with each other and positioned on the same plane. Each jet nozzle 8 has an axis parallel to the axes of the guide rod 48, the screw rod 68 and the guide rod 58. Similarly, each jet nozzle 9 has an axis parallel to the axes of the guide rod 53, the screw rod 75 and the guide rod 63.

Next, the structure relating to drive for rotating the rollers 2 and 3 will be explained with reference to FIG. 6.

A sprocket wheel 24 is fixed, close to the bearing 13, on the shaft 23 integral with the roller 3. On the other hand, three sprocket wheels 18, 19 and 20 are fixed, close to the bearing 12, on the shaft 17 integral with the roller 2. A chain 26 is passed around the sprocket wheel 19 on the shaft 17 and the sprocket wheel 24 on the shaft 23.

Figure 6:
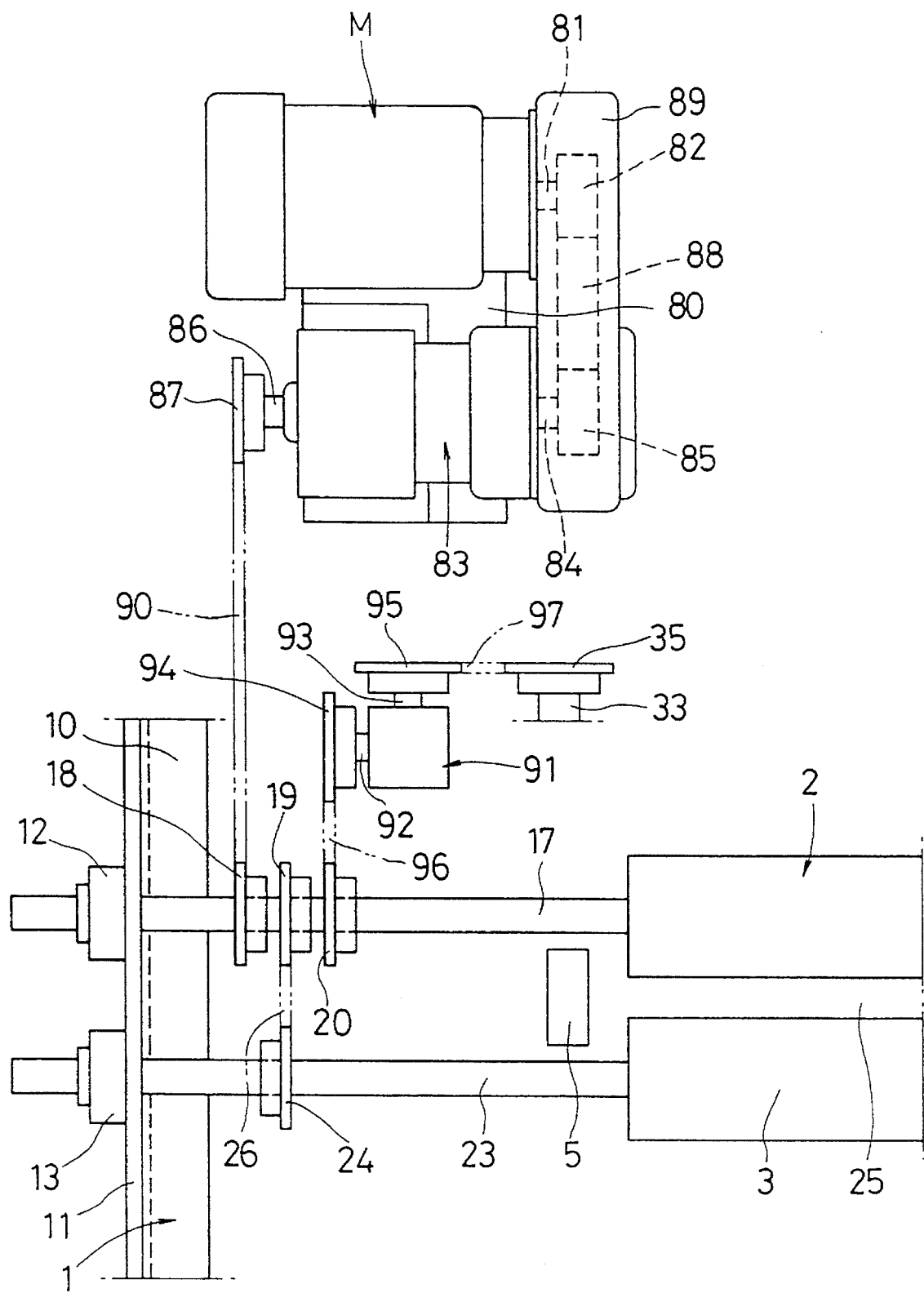
FIG. 6 is an enlarged plan view showing an essential part of the skin removing apparatus of FIG. 1.

As shown in FIG. 6, a mounting table 80 is disposed close to one end of the base 1. A motor M is mounted on one end of this mounting table 80. A drive pulley 82 is fixed to an output shaft 81 of the motor M. A speed reducer 83, for reducing the rotational speed of the motor M, is mounted on the other end of the mounting table 80. A driven pulley 85 is fixed to an input shaft 84 of the speed reducer 83. An output shaft 86 of the speed reducer 83 is fixed to a drive sprocket wheel 87. A belt 88 is passed around the drive pulley 82 and the driven pulley 85. A cover 89, for covering the drive pulley 82, the driven pulley 85 and the belt 88, is disposed at one side of the motor M and the speed reducer 83.

As shown in FIG. 6, a drive chain 90 is passed, around the drive sprocket wheel 87 and the sprocket wheel 18 secured to the shaft 17 integral with the roller 2.

Next, driving of the roller chain will be explained with reference to FIG. 6. The roller chain 4 rotates in response to the rotation of the sprocket wheel 34 which is driven by the shaft 33. A sprocket wheel 35 is secured to one end of the shaft 33. A gear box 91, having two rotary axes 92 and 93 protruding normal to each other, is mounted on the base 1 close to the one end thereof. Sprocket wheels 94 and 95 are fixed to these rotary axes 92 and 93, respectively. A drive chain 97 is passed around the sprocket wheel 95 of the rotary shaft 93 and the sprocket wheel 35 of the shaft 33. A drive chain 96 is passed around the sprocket wheel 94 of the rotary axis 92 and the sprocket wheel 20 of the shaft 17 integral with the roller 2.

Accordingly, rotation of the shaft 17 of the roller 2 is transmitted to the shaft 33 through the sprocket wheel 20, the drive chain 26, sprocket 94, gear box 91, sprocket wheel 95, drive chain 97 and sprocket wheel 35.

Next, operation of this embodiment will be explained.

First, when the motor M is driven, rotation of its output shaft 81 is transmitted through the drive pulley 82, the belt 88 and the driven pulley 85 to the input shaft 84 of the speed reducer 83, as shown in FIG. 6, thus rotating the input shaft 84 of the speed reducer 83. In response to the rotation of the input shaft 84, the output shaft 86 of the speed reducer 83 rotates and this rotation is transmitted through the sprocket wheel 87 and the chain 90 to the sprocket wheel 18 secured to the shaft 17 of the roller 2.

Rotation of the sprocket 18 directly causes the shaft 17 and the roller 2 to rotate. Rotation of the shaft 17 further causes the shaft 23 and roller 3 to rotate through the sprocket wheel 19 of the shaft 19, the chain 26, and the sprocket wheel 24 of the shaft 23.

Through the above drive transmission mechanism, the motor M causes the roller 2 (its shaft 17) and the roller 3 (its shaft 23) to rotate in the same rotational direction (i.e. the clockwise direction as shown by the arrows in FIGS. 4, 5 and 7) at the same rotational speed.

On the other hand, the rotation of the shaft 17 of the roller 2 causes the rotation of the gears in the gear box 91 through sprocket wheel 20, chain 96 and sprocket wheel 93, thereby causing the rotation of the rotary shaft 93 in the gear box 91. Then, the rotation of the rotary shaft 93 in the gear box 91 causes the rotation of the shaft 33 through sprocket wheel 95, chain 97 and sprocket wheel 35.

In response to the rotation of the shaft 33, the sprocket wheel 34 secured to the shaft 33 is rotated. Rotational direction of the sprocket wheel 34 is counter-clockwise as shown by the arrow in FIG. 1.

Rotation of the sprocket wheel 34 causes the movement of the roller chain 4 passed around this sprocket wheel 34 and the other sprocket wheel 39 in the direction shown by the arrow a in FIG. 1.

In response to the movement of the roller chain 4 caused by the rotation of the sprocket 34, the feed plate 5 constituting the carrier moves straight above the clearance 25 between the rollers 2 and 3 along the longitudinal direction of the clearance 25. More specifically the feed plates 5, each fixed to the distal end of the arm 43 extending downward from the link plate 40 of the lower horizontal portion 4b of the roller chain 4, are positioned slightly above the clearance 25 between the rollers 3 and 4 as shown in FIG. 7 so that the center of the feed plate 5 substantially coincides with the center of an onion 99 riding on the rollers 3 and 4. The axis (a vertical line) of the arm 43 is normal to the line (a horizontal line) connecting the axes of the rollers 3 and 4.

When the air compressor is driven after starting the drive of the roller chain 4, the air compressor supplies compressed air into air pipes 6 and 7 respectively. Then, compressed air is jetted through the jet nozzles 8 and 9 of the air pipes 6 and 7 toward the clearance 25 between the rollers 2 and 3 from diagonally above direction as shown in FIGS. 4, 5 and 7.

Then, an onion, with its stem and root cut off by a cutting device (not shown) and its skin formed plural slits 98a, is supplied onto the upstream ends of the rollers 2 and 3.

Onions 99, mounted on the rollers 2 and 3, are affected by the rotation of the rollers 2, 3 to roll in the direction as illustrated by an arrow of FIG. 7. Thus, the skin 98 of the onions 99 come to be brought into contact with the outer surfaces of the roller 2 (or the tube 22) and the roller 3. At the same time, the movement of the lower horizontal portion 4b of the roller chain causes the feed plates 5, constituting the carrier, to push each onion from behind to transfer it from the sides of transfer start ends towards transfer completion ends ( on the side of chute 27) of the rollers 2 and 3.

As illustrated in FIG. 7, the compressed air from the jet nozzle 8 of the air pipe 6 and the jet nozzle 9 of the air pipe 7 is jetted against the onions 99 while being transferred along the rollers 2 and 3 by being pushed by the fed plates 5. The direction of compressed air jetted from the nozzle 9 substantially coincides with the tangential line to the contour of each onion rotating on the roller 2 (including tube 22) and roller 3.

Therefore, compression air jetted from the jet nozzles 8, 9 of the air pipes 6, 7 causes the onion 99 to be pressed against the outer surfaces of the rollers 2, 3. Thus friction is developed between the skin 98 of an onion 99 and the rubber tube 22 of the roller 2, thereby causing the onion 99 to be rotated effectively as the rollers 2 and 3 rotate. Thus, almost the whole surface area of an onion 99 having many slits 98a in the skin will face certainly the jet nozzles 8 and 9 sometime or other while the onion 99 is transferred towards the chute 27, thereby causing the skin of the onion to be removed completely along the slits 98a.

The onions 99, after getting their skins completely removed by the compressed air from the jet nozzles 8 and 9, are pushed by the feed plates 5 and dumped into the chute 27 and then dropped along the slope of the chute 27 to be moved out of the base 1 and fed to the next process such as one for fine cutting of the onions 99 with fine cutting machine or the like.

The skins removed from the onions 99 by the compressed air supplied from the jet nozzles 8, 9 of the air pipes 6, 7 are ejected out of the base 1 through the clearance 25 between the roller 2 (including the tube 22) and the roller 3.

Manually turning the handles 70 and 77 causes the screw rods 68 and 75 supported by the bearings 69 and 76 to rotate, thereby further causing the nuts 71 and 78 engaged with these screw rods 68 and 75 to move along the axial directions of the screw rods 68 and 75, i.e. in the directions indicated by arrows b and c in FIG. 7. Consequently, the jet nozzles 8 and 9 secured to the nuts 71 and 78 also move in the directions of the arrows b and c, i.e. the axial directions of the jet nozzles 8 and 9. Thus, it becomes possible to adjust the points of the jet nozzles 8 and 9 of the air pipes 6 and 7 to optimum positions depending on the sizes of the onions 99 to be processed.

As described above, in a bulbar skins removing apparatus according to the present invention, a carrier is designed for transferring the onion placed on a pair of horizontally disposed rollers in a direction parallel to the axial directions of the rollers, the carrier comprising a chain including the portions parallel to the axial directions of the rollers and disposed above the gap between the rollers, arms with their bases fixed to the chain and their axial centers confronting the gap between the rollers, and the feed plates respectively fixed to the distal ends of the arms. With this arrangement, the arm always remains in a vertical plane including the chain, and so there is no fear of causing the chain to be twisted due to the weight of the arms and the feed plates.

Furthermore, according to the bulbar skin removing apparatus of the present invention, the compressed air is jetted against the bulbs mounted on the rollers from obliquely above. Thus, the skins removed by the air is forcibly dropped through the clearance between the rollers without being blown upward.

Thus, in the case of the bulbar skin removing apparatus according to the present invention, the carrier can be driven stably, and the removed skins will not enter between the onions and the rollers to hinder the transfer of onions and removal of skins.

What is claimed is:

1. An apparatus for removing the skins of bulbs comprising:

a pair of rollers disposed in parallel with each on a horizontal plane;

a roller driving means for rotating said pair of rollers in the same direction;

a carrier means for transferring bulbs placed on said pair of rollers along a direction parallel to axes of said rollers; and a fluid jet means for jetting fluid against said bulbs placed on said pair of rollers, wherein said carrier means comprises an endless belt positioned above a clearance between said rollers and having a portion moving along a path parallel to the axes of said rollers, a chain drive means for driving said endless belt along the path, arms each having a base end fixed to said endless belt and a main body directed toward the clearance between said rollers, and feed plates each attached to a distal end of said arm; and said fluid jet means comprises jet nozzles disposed obliquely above any one of or both of said pair of rollers to jet said fluid substantially toward the clearance between said rollers.

2. An apparatus for removing skins of bulbs in accordance with claim 1, wherein said fluid jet means comprises fluid pipes having axes parallel to the axes of said rollers and a plurality of nozzles disposed at regular intervals on and along longitudinal directions of said fluid pipes.

3. An apparatus for removing skins of bulbs in accordance with claim 2, further comprising a means for causing a parallel movement of said fluid pipes in a direction parallel to axes of said nozzles.

4. An apparatus for removing skins of bulbs in accordance with claim 1, wherein said endless belt is a roller chain.

5. An apparatus for removing skins of bulbs in accordance with claim 1, wherein at least one of said rollers is partially covered with a rubber tube.

* * * * *